April 28, 1925.
E. A. NEW
ICE CUTTING MACHINE
Filed March 29, 1922   2 Sheets-Sheet 1
1,535,334
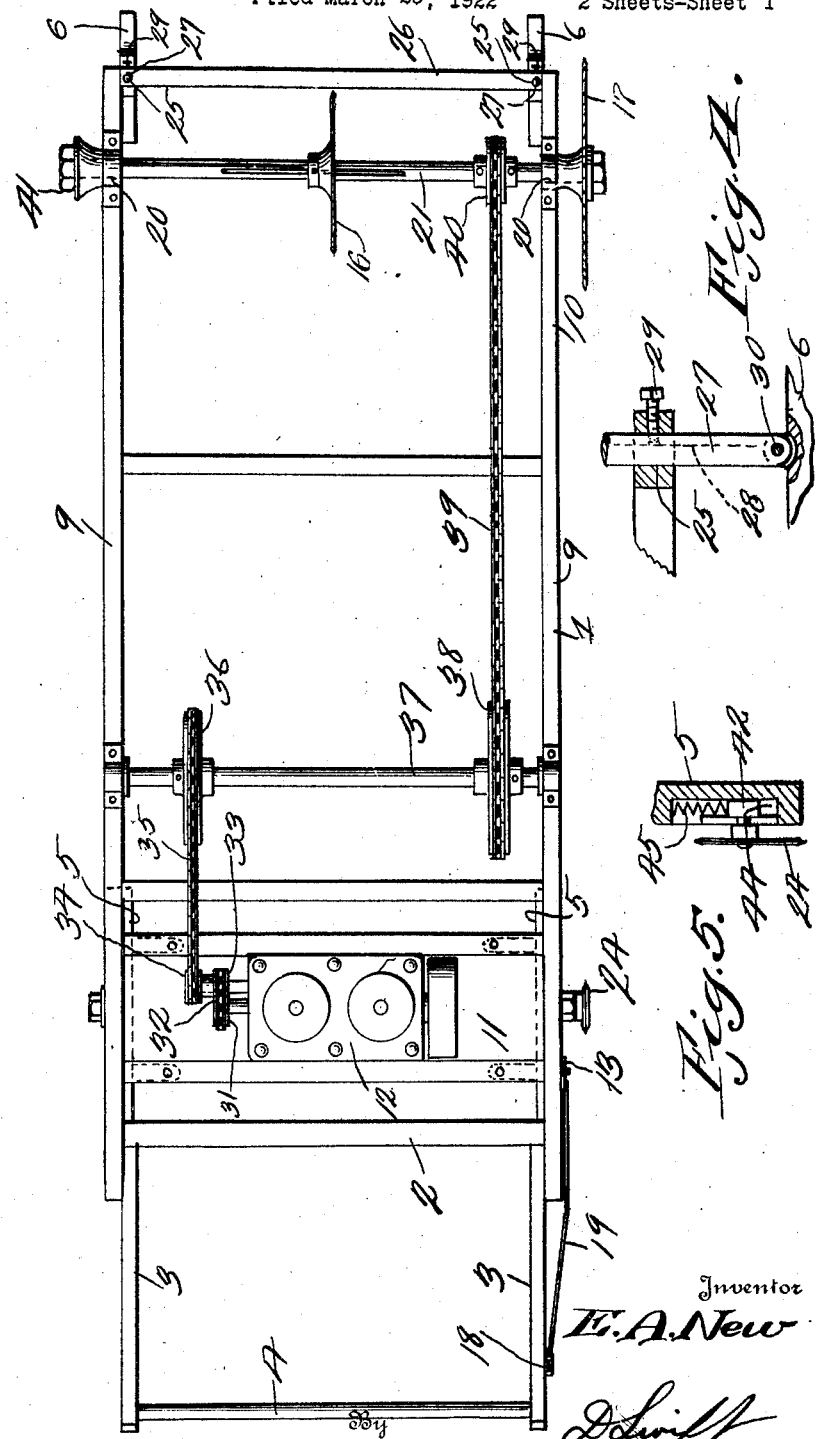
Inventor
E. A. New
Attorney April 28, 1925.
E. A. NEW
ICE CUTTING MACHINE
Filed March 29, 1922   2 Sheets-Sheet 2
1,535,334
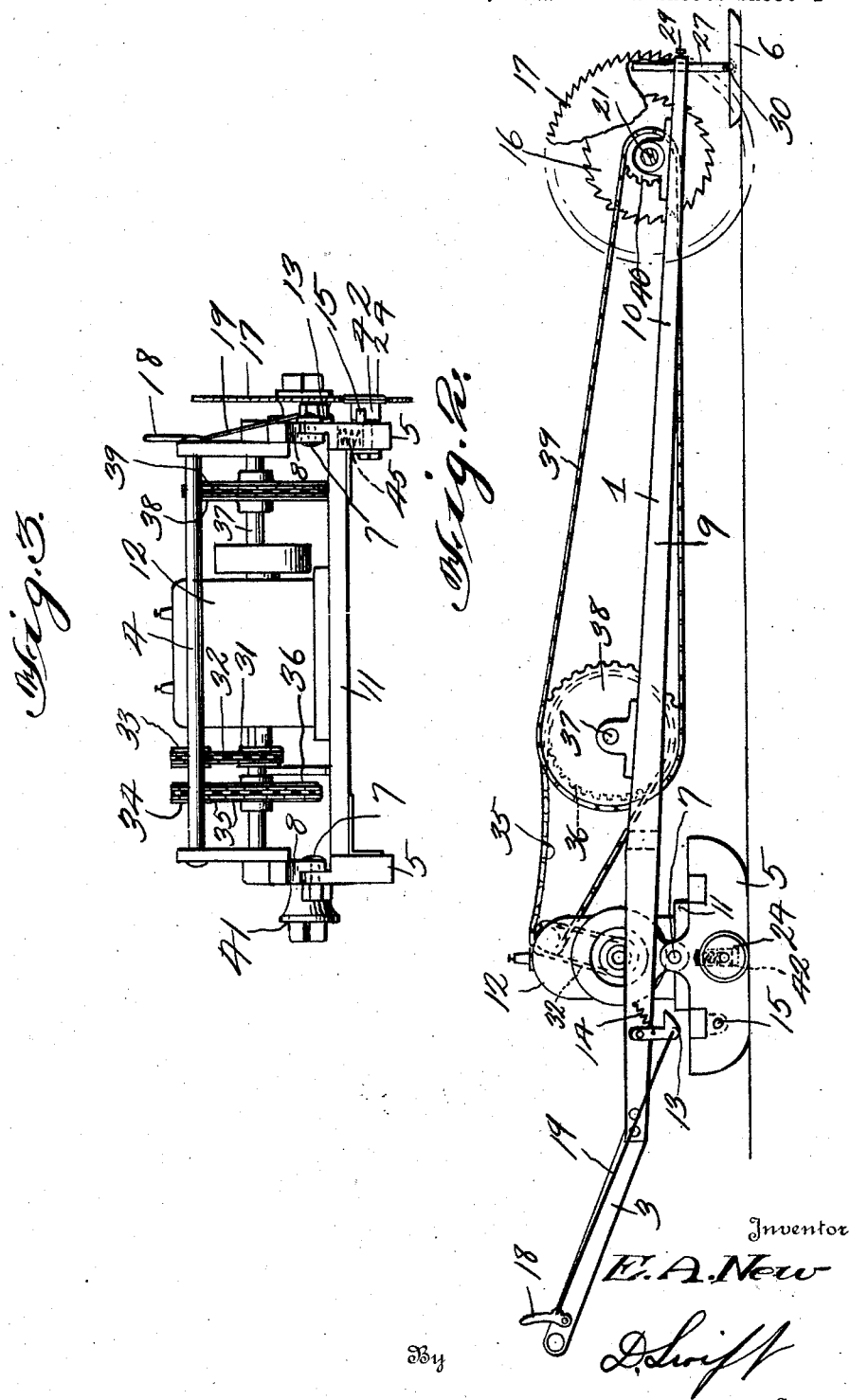
Inventor
E. A. New
By D. Swift
Attorney Patented Apr. 28, 1925.

1,535,334

UNITED STATES PATENT OFFICE.

EDWARD ALBERT NEW, OF GREAT BARRINGTON, MASSACHUSETTS.

ICE-CUTTING MACHINE.

Application filed March 29, 1922. Serial No. 547,799.

*To all whom it may concern:*

Be it known that I, EDWARD ALBERT NEW, a citizen of the United States, residing at Great Barrington, in the county of Berkshire, State of Massachusetts, have invented a new and useful Ice-Cutting Machine; and I do hereby declare the following to be a full, clear, and exact description of the invention, such as will enable others skilled in the art to which it appertains to make and use the same.

The invention relates to ice cutting machines and has for its object to provide a device of this character wherein a field of ice may be blocked off and partially severed in such a manner that blocks of ice may be broken apart and floated or otherwise conveyed to an ice house or other point of deposit.

A further object is to provide an ice cutting machine comprising a frame mounted on runners at its forward and rear ends and also rockably mounted on the runners, said frame being provided with a severing saw and an adjustable marking saw, said saws being driven by a motor mounted on the frame. Also to provide a spring actuated guide member adjacent one of the rear runners and preferably carried thereby, said guide member being adapted to be received by a slot previously cut in the ice by the marking saw, thereby guiding the saw in the forward movement of the machine.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the ice cutting machine.

Figure 2 is a side elevation of the device.

Figure 3 is a rear elevation.

Figure 4 is a side elevation of one of the vertically slidable shafts for one of the front runners showing adjacent parts in section.

Figure 5 is a detail sectional view through one of the runners showing the mounting of the guide wheel.

Referring to the drawings, the numeral 1 designates a rectangular shaped frame, the rear end 2 of which is provided with rearwardly and upwardly extending arms 3 which are connected together by a handle bar 4, adapted to be grasped by the operator for forcing the machine forwardly on its supporting runners 5 and 6. The runners 5 are pivotally connected at 7 to downwardly extending brackets 8 carried by the side rails 9 of the frame 1, which runners form supporting means for the rear end 2 of the frame and the pivotal points 7 form the rocking point for the frame as a whole, thereby allowing the operator to raise and lower the front end 10 of the frame by pushing down on or allowing the handle member 4 to rise.

The runners 5 are connected together by means of a transversely disposed member 11 on which is secured in any suitable manner a conventional form of motor 12 which may be an internal combustion engine, or an electric motor. It will be seen that the entire weight of the motor is supported on the runners 5 and consequently the operator may easily tilt the relatively light frame 1, and if so desired may tilt the frame, for instance during a turning operation or in transferring the machine to a point where the spring actuated hook 13 carried by one of the side bars 9 of the frame and actuated by the spring 14 will hook over the lug 15 carried by one of runners 5 and holding the frame 1 tilted, the weight of the motor 12 preventing vertical longitudinal tilting of the runners 5 and consequently the forward end 10 of the frame will be maintained in raised position, where the marking saw 16 and the cutting saw 17 will be out of engagement with the ice. The spring actuated hook 13 when in engagement with the lug 15 may be easily and quickly removed by the operator by forcing downwardly the pivoted handle carried by one of the arms 3 and connected to the hook by means of the connecting rod 19, therefore it will be seen that the frame 1 may be easily and quickly released when the operator positions the machine for cutting and marking. Extending transversely of the frame 1 adjacent its forward end and rotatably mounted in bearings 20 is a shaft 21, the outer end of the shaft being provided with a cutting saw 17 adapted to cut the ice partially through so that it can be easily broken into blocks. Adjustably mounted on the shaft 21 is a marking saw 16, which may be adjusted at various distances from the saw 17 and utilized for scoring the ice for forming a guiding groove for the reception of the spring actuated guide wheel 24, which guide wheel is received in the cut made by the marking saw 16, and as the guiding wheel 24 is in alignment with the cutting saw 17, it is obvious that the saw may be guided accurately for cutting a field of ice into blocks of uniform size.

Vertically slidable, but not rotatable, in bearings 25 of the bar 26 are shanks 27, which shanks are provided with vertically disposed slots 28 which receive set screws 29, which extend through the bar 26, said set screws forming means whereby the shanks are guided in their upward and downward movement and also forming means for preventing rotation of the shanks 27 in their bearings 25. However if the set screws 29 are tightened, the shanks 27 may be held against movement in such a manner that the forward runners 6 which are pivoted at 30 to the lower ends of the shanks 27, will hold the cutting and marking saws 17 and 16 above the surface of the ice in such a manner that the machine as a whole may be moved from place to place. The shaft 21 is driven by the motor 12 through the sprocket 31, sprocket chain 32, sprocket 33, sprocket 34, carried by the same sleeve as the sprocket 33, and thence through a loose sprocket chain 35 which allows freedom of movement of the frame when it is moved in a vertical plane. The sprocket chain 35 passes over a sprocket 36 carried by a transversely disposed shaft 37. It will be seen that power is transmitted through the shaft 37 in such a manner that the sprocket chains will not interfere with the pivotal movement of the frame 1. The shaft 37 is provided with a sprocket 38, and over which sprocket 38 a sprocket chain 39 passes, said sprocket chain 39 passing over a sprocket 40 carried by the shaft 21, thereby transmitting power for driving the cutting saw 22 and a marking saw 23. If so desired a second marking saw may be secured to the mandrel 41.

The guiding wheel 24 is pivotally mounted on a vertically slidable rectangular shaped member 42, slidable in the guide 44 of one of the runners 5 and normally forced downwardly by means of a coiled spring 45, thereby maintaining the guide wheel 24 at all times in a guide groove during the advancement of the machine.

From the above it will be seen that an ice cutting and marking machine is provided, which is simple in construction and so constructed that an operator may easily tilt the frame without tilting the engine.

The invention having been set forth what is claimed as new and useful is:—

The combination with an ice cutting machine comprising a frame, a handle member carried by the frame, supporting runners pivotally connected to the frame adjacent the rear end, an engine supported by said runners, a rotatable sawing element carried by the forward end of the frame and driven by the engine, a lug carried by one of the runners rearwardly of the pivotal point of the frame, a hooked member pivoted to the frame rearwardly of the pivotal point of the frame and cooperating with said lug for holding the frame in tilted position, said hook being controllable from adjacent the handle member.

In testimony whereof I have signed my name to this specification in the presence of two subscribing witnesses.

EDWARD ALBERT NEW.

Witnesses:
  CHARLES M. CONKLIN,
  WALTER B. SANFORD.